United States Patent
Sikora et al.

(10) Patent No.: US 12,555,611 B1
(45) Date of Patent: Feb. 17, 2026

(54) METHOD AND SYSTEM FOR ASSOCIATING AUDIO INFORMATION WITH A VIDEO CAMERA BASED ON A PROXIMITY CONNECTION

(71) Applicant: MOTOROLA SOLUTIONS, INC., Chicago, IL (US)

(72) Inventors: Szymon Sikora, Cracow (PL); Maciej Stawiszynski, Cracow (PL); Jakub Siedlik, Tarnow (PL); Pawel Pak, Adamow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/978,005

(22) Filed: Dec. 12, 2024

(51) Int. Cl.
*G11B 27/34* (2006.01)
*H04N 7/18* (2006.01)

(52) U.S. Cl.
CPC ............... *G11B 27/34* (2013.01); *H04N 7/18* (2013.01)

(58) Field of Classification Search
CPC .................................. G11B 27/34; H04N 7/18
See application file for complete search history.

(56) References Cited

U.S. PATENT DOCUMENTS

| | | | |
|---|---|---|---|
| 9,633,270 B1 | 4/2017 | Tangeland et al. | |
| 10,153,002 B2 | 12/2018 | Anand et al. | |
| 10,433,002 B1 | 10/2019 | Kuplevakthsky | |
| 10,848,889 B2 | 11/2020 | Sheaffer et al. | |
| 11,954,065 B2 | 4/2024 | Boutell et al. | |
| 2016/0373834 A1* | 12/2016 | Cao | H04N 21/233 |
| 2020/0374422 A1* | 11/2020 | Takada | H04N 21/2665 |
| 2022/0319014 A1* | 10/2022 | Meitav | G06T 3/4007 |
| 2023/0087554 A1 | 3/2023 | Guzik et al. | |
| 2024/0007744 A1* | 1/2024 | Muthiah | H04N 23/90 |

FOREIGN PATENT DOCUMENTS

WO 2014105342 A1 7/2014

OTHER PUBLICATIONS

Sim, Yew Tatt et al.: Method For Retrieving Public Safety Device Media Based on Surveillance Camera Zoom Threshold, Motorola Solutions, Inc. 2024, all pages.

* cited by examiner

*Primary Examiner* — Thai Q Tran
*Assistant Examiner* — Jose M Mesa

(57) ABSTRACT

A method and system for associating audio information with a video camera based on a proximity connection is disclosed. The system includes at least one microphone configured to capture audio within a first dimensionally-defined region detailed in audio metadata of the audio. The system also includes at least one video camera having a dynamic or static Field Of View (FOV) configured to capture video, and the FOV providing camera coverage encompassing at least a second dimensionally-defined region defined in metadata of the video. Based on a determination that a region overlap exists between the first dimensionally-defined region and the second dimensionally-defined region, the metadata of the video is updated to indicate availability of at least a time-delimited portion of the captured audio having a proximity connection to at least a corresponding time-delimited portion of the captured video.

19 Claims, 4 Drawing Sheets

METHOD AND SYSTEM FOR ASSOCIATING AUDIO INFORMATION WITH A VIDEO CAMERA BASED ON A PROXIMITY CONNECTION

BACKGROUND

Video capturing via surveillance cameras has been increasing over time, and indeed this activity has well recognized benefits as a component in an overall physical security solution for a building, a premises, etcetera. Video capturing can be enhanced by simultaneous audio capturing. This enhancement may take the form of, for example, detecting sounds such as, for instance, footsteps or breaking glass that may enable early intruder detection and potentially improved security monitoring within the overall physical security solution.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
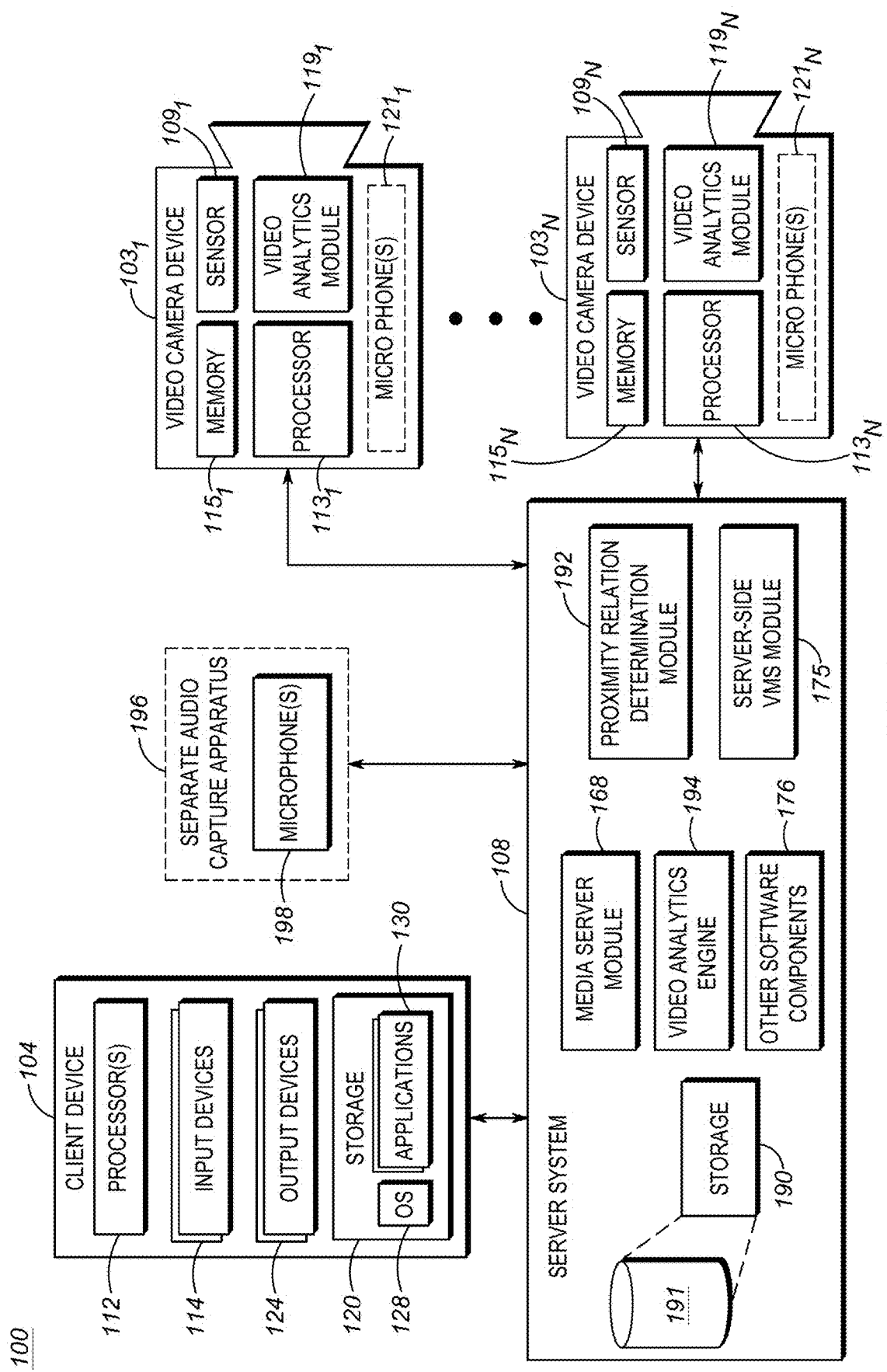
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a system that includes at least one microphone configured to capture audio within a first dimensionally-defined region detailed in audio metadata of the audio. The system also includes at least one video camera lacking any direct physical or direct communicative connection to the at least one microphone. The at least one video camera has a dynamic or static Field Of View (FOV) configured to capture video, and the FOV provides camera coverage encompassing at least a second dimensionally-defined region defined in metadata of the video. The system also includes at least one processor. The system also includes at least one electronic storage medium in communication with the at least one processor. The at least one electronic storage medium stores program instructions that when executed by the at least one processor cause the at least one processor to perform making a determination, by comparing a portion of the audio metadata to a portion of the metadata of the video, that a region overlap exists between the first dimensionally-defined region and the second dimensionally-defined region. Based on the determination, the metadata of the video is updated to indicate availability of at least a time-delimited portion of the captured audio having a proximity connection to at least a corresponding time-delimited portion of the captured video.

In accordance with another example embodiment, there is provided a method that includes capturing audio via at least one microphone and within a first dimensionally-defined region detailed in audio metadata of the audio. The method also includes actuating at least one video camera to capture video. The at least one video camera is lacking any direct physical or direct communicative connection to the at least one microphone. The at least one video camera has a dynamic or static Field Of View (FOV), and the FOV provides camera coverage encompassing at least a second dimensionally-defined region defined in metadata of the video. The method also includes operating at least one processor to execute program instructions to cause the at least one processor to perform making a determination, by comparing a portion of the audio metadata to a portion of the metadata of the video, that a region overlap exists between the first dimensionally-defined region and the second dimensionally-defined region. Based on the determination, updating the metadata of the video to indicate availability of at least a time-delimited portion of the captured audio having a proximity connection to at least a corresponding time-delimited portion of the captured video.

Each of the above-mentioned embodiments will be discussed in more detail below, starting with example system and device architectures of the system in which the embodiments may be practiced, followed by an illustration of processing blocks for achieving an improved technical method, device, and system for associating audio information with a video camera based on a proximity connection.

Example embodiments are herein described with reference to flowchart illustrations and/or block diagrams of methods, apparatus (systems) and computer program products according to example embodiments. It will be understood that at least some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example system 100 within which methods in accordance with example embodiments can be carried out. Included within the illustrated system 100 are one or more client devices 104 and a server system 108. The client device 104 may be, for example, a desktop computer; a handheld device such as, for instance, a tablet, a phablet, a two-way radio, a smart phone or a personal digital assistant (PDA); a laptop computer; a smart television; or some other suitable client device. With respect to the server system 108, this could comprise a single physical machine or multiple physical machines. In some examples, at least a portion of the illustrated server system 108 may be implemented in the cloud. Also, it will be understood that the server system 108 need not be contained within a single chassis, nor necessarily will there be a single location for the server system 108. As will be appreciated by those skilled in the art, at least some of the functionality of the server system 108 can be implemented within the client device 104 rather than within the server system 108.

The client device 104 communicates with the server system 108 through one or more wired and/or wireless networks. These networks can include the Internet, or one or more other public/private networks coupled together by network switches or other communication elements. The network(s) could be of the form of, for example, client-server networks, peer-to-peer networks, etc. Data connections between the client device 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links).

The client device 104 includes at least one processor 112 that controls the overall operation of the client device. The processor 112 interacts with various subsystems such as, for example, input devices 114 (such as a selected one or more of a keyboard, mouse, scanner, touch pad, roller ball and voice control means, for example), storage 120, and output devices 124 (such as, for instance, display screen(s), speaker(s), etcetera).

Still with reference to the client device 104 of the system 100, Operating System (OS) 128 and various applications 130 used by the processor 112 are stored in a non-volatile portion of the storage 120. A Video Management System (VMS) application, for viewing and carrying out other user-driven activities in relation to surveillance video, is one possible example of the applications 130. An email application, for sending and receiving emails, is another possible example of the applications 130.

Regarding the operating system 128, this includes software that manages computer hardware and software resources of the client device 104 and provides common services for computer programs. Also, those skilled in the art will appreciate that the operating system 128 and the applications 130, or parts thereof, may be temporarily loaded into a volatile portion (for example, random access memory portion) of the storage 120. The processor 112, in addition to its operating system functions, can enable execution of the various applications 130 on the client device 104.

Still with reference to FIG. 1, the server system 108 includes several software components for carrying out particular functions of the server system 108. For example, the server system 108 includes a media server module 168. The media server module 168 handles requests within the system 100 related to server-managed storage and retrieval of surveillance video taken by video camera devices $103_1$-$103_n$. The server system 108 also includes a video analytics engine 194. The video analytics engine 194 can, in some examples, be any suitable one of known commercially available software that carries out computer vision related functions (complementary to any video analytics performed in the surveillance cameras) as understood by a person of skill in the art. Other suitable implementation alternatives, apparent to those skilled in the art, are also contemplated.

The server system 108 also includes a server-side VMS module 175 which supports server-side functionality of a VMS including, for example, handling client requests originating from a VMS application in the client device 104. The server system 108 also includes a proximity relation determination module 192 for associating audio captured in respect of a plurality of defined locations with video captured in respect of video cameras installed in a plurality of different locations.

The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded surveillance video, other sensor data, etc. in accordance with example embodiments. The one or more databases 191 may also contain metadata related to, for example, the recorded surveillance video that is storable within the one or more data stores 190. Examples of metadata that may be expected to be derived directly or indirectly from video data include location in field of view, object ID, bounding box-related data, tracking position relative to field of view, etc. The one or more databases 191 may also contain other metadata including audio metadata and metadata describing relationships between captured video and captured audio.

The illustrated system 100 includes a plurality of video camera devices $103_1$-$103_n$ (hereinafter interchangeably referred to as "video cameras $103_1$-$103_n$" when referring to all of the illustrated cameras, or "video camera 103" when referring to any individual one of the plurality) being operable to capture video (the video may include a plurality of images and image data, produced within the video camera, that represents the plurality of captured images). Furthermore, it will be understood that the system 100 includes any suitable number of video cameras (i.e. n is any suitable integer greater than one).

The video camera 103 includes an image sensor 109 (corresponding to one of the sensors $109_1$-$109_N$ shown in FIG. 1) for capturing a plurality of images. The video camera 103 may be a digital video camera and the image sensor 109 may output captured light as a digital data. For example, the image sensor 109 may be a CMOS, NMOS, or CCD. In some embodiments, the video camera 103 may be an analog video camera connected to an encoder. The illustrated video camera 103 may be a 2D camera; however use of a structured light 3D camera, a time-of-flight 3D camera, a 3D Light Detection and Ranging (LiDAR) device, a stereo camera, or any other suitable type of camera within the system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the video camera 103 may be a "multi-sensor" type of video camera, such that the video camera 103 includes pairs of two or more sensors that are operable to capture light in different and/or same frequency ranges.

The video camera 103 may be a dedicated camera. It will be understood that a dedicated camera herein refers to a camera whose principal features is to capture images or video. In some example embodiments, the dedicated camera may perform functions associated with the captured video, such as but not limited to processing the image data produced by that dedicated camera or by another camera. In some examples, the dedicated camera may be a surveillance camera, such as any one of a Pan-Tilt-Zoom (PTZ) camera, dome camera, in-ceiling camera, box camera, and bullet camera.

Additionally, or alternatively, the video camera 103 may include an embedded camera. It will be understood that an embedded camera herein refers to a camera that is embedded within a device that is operational to perform functions that are unrelated to the captured video. For example, the embedded camera may be a camera found on any one of a drone device, a vehicle, a security panel, etc.

The video camera 103 includes one or more processors 113 (corresponding to one of the processors $113_1$-$113_N$ shown in FIG. 1), one or more video analytics modules 119 (corresponding to one of the video analytics modules $119_1$-$119_N$ shown in FIG. 1), and one or more memory devices 115 (corresponding to one of the memories $115_1$-$115_N$ shown in FIG. 1) coupled to the processors and one or more network interfaces. Regarding the video analytics module 119, this generates metadata outputted to the server system 108. The metadata can include, for example, records which describe various detections of objects (persons, vehicles, animals, etcetera) such as, for instance, pixel locations for the detected object in respect of a first record and a last record for the camera within which the respective metadata is being generated. In the case where the video camera 103 includes optional microphone(s) 121, the metadata generated within the video camera 103 may include both audio and video metadata.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the video camera 103, including the processor 113, may be combined together on one semiconductor chip. For example, the processor 113, the memory device 115 and the network interface of the video camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the video camera 103 is coupled to the server system 108. In some examples, the video camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the video camera 103 and the server system 108 can be any number of known arrangements, examples of which were previously herein detailed. In some examples, the video camera 103 is remote from the server system 108.

As mentioned, the video camera 103 may optionally include the microphone 121. Alternatively (or in combination), the system 100 may optionally include one or more separate audio capture apparatus 196. The audio capture apparatus 196 includes one or more microphones 198. Thus, as an alternative to audio capture via an embedded microphone (i.e. the microphone 121), audio capture via a dedicated microphone (i.e. the microphone 198) is also contemplated.

Figure 2:
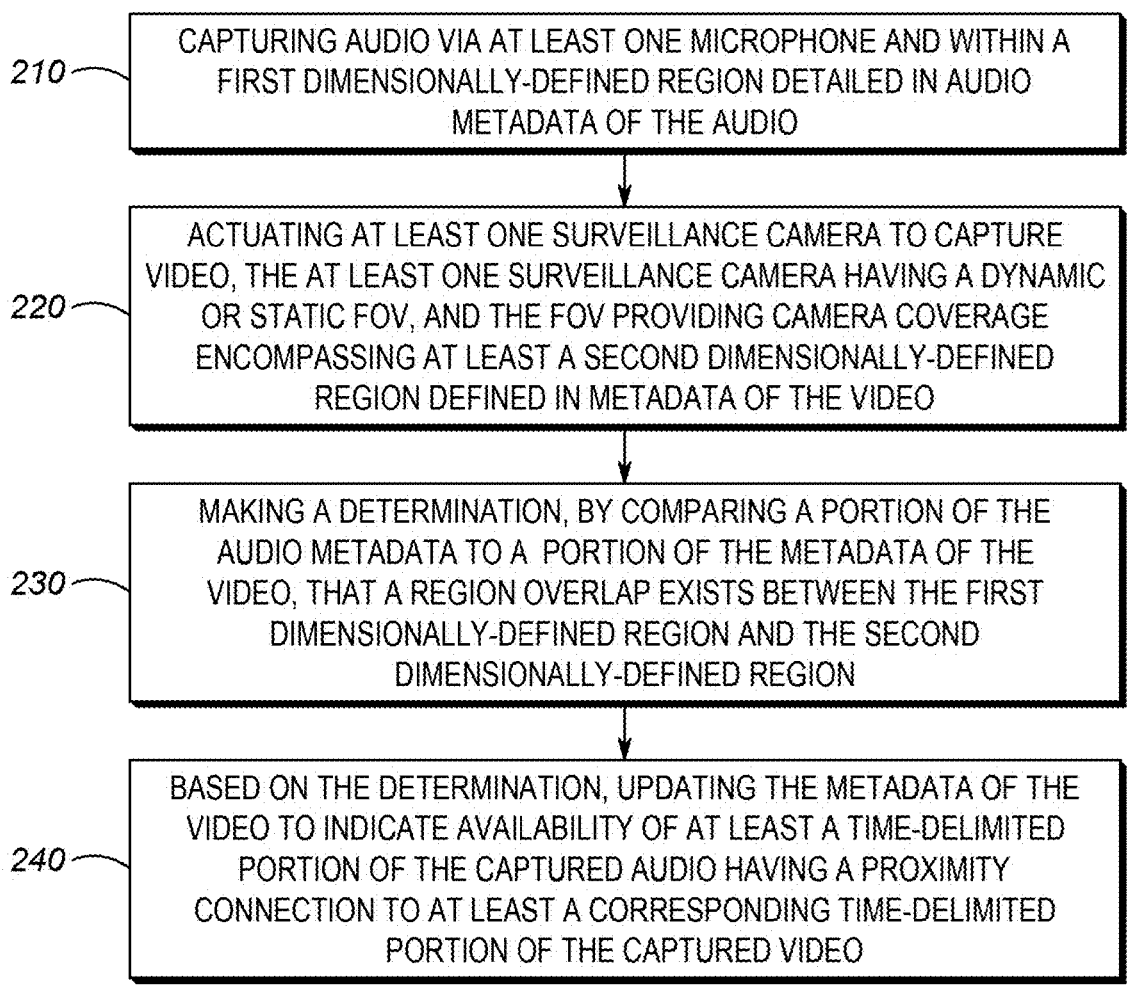
FIG. 2 is a flow chart illustrating a method in accordance with an example embodiment.

Reference is made to FIG. 2. FIG. 2 is a flow chart illustrating a method 200 in accordance with an example embodiment.

Firstly in the method 200 of FIG. 2, audio is captured (210) via at least one microphone (such as, for example, any suitable number of the microphones 121 and/or the microphones 198 shown in FIG. 1). Also, the capturing of this audio is within a first dimensionally-defined region detailed in audio metadata of the audio.

Next in the method 200, at least one surveillance camera (for example, the video camera 103) is actuated (220) to capture video. This at least one surveillance camera may be lacking any direct physical or direct communicative connection to the above-mentioned at least one microphone. Also, the at least one surveillance camera may have a dynamic or static Field Of View (FOV), and this FOV may provide camera coverage encompassing at least a second dimensionally-defined region defined in metadata of the video.

In at least one example, the surveillance camera may be a Pan-Tilt-Zoom (PTZ) camera (and thus having a dynamic FOV). In the case of a PTZ camera, the second dimensionally-defined region varies when at least one a zoom setting, a pan setting and a tilt setting is changed.

In another at least one example, the above-mentioned at least one surveillance camera (which is not necessarily a PTZ camera) may include another microphone (the another microphone may be, for example, microphone 121 shown in FIG. 1). This another microphone is configured to capture additional audio. Thus, many different permutations of distributions of the microphones throughout the system 100 are contemplated. For instance, each of the optional microphones 121$_1$-121$_N$ may be contained in a respective different housing of a corresponding one of the cameras 103$_1$-103$_N$ capturing different audios at respective different locations. The microphone(s) 198 included in the separate audio capture apparatus 196 may also be capturing audio in combination with (or in alternative to) one or more of the optional microphones 121$_1$-121$_N$.

Next in the method 200, a determination is made (230), by comparing a portion of the audio metadata to a portion of the metadata of the video, that a region overlap exists between the first dimensionally-defined region and the second dimensionally-defined region. The action 230 may be carried out by, for example, the proximity relation determination module 192 within the server system 108.

Next in the method 200, and based on the action 230, the metadata of the video is updated (240) to indicate availability of at least a time-delimited portion of the captured audio having a proximity connection to at least a corresponding time-delimited portion of the captured video. The action 240 may be carried out by, for example, the server-side VMS module 175 within the server system 108.

In at least one example, the aforementioned at least one microphone may include another microphone configured to capture additional audio within a third dimensionally-defined region detailed in additional audio metadata of the additional audio. In such case, the third dimensionally-defined region would be different than the first dimensionally-defined region and, beyond the illustrated actions of the illustrated method 200, there is a contemplated possibility of having a further determination being made, by way of a portion of the additional audio metadata being compared to the portion of the metadata of the video, that there is an additional region of overlap existing between the third dimensionally-defined region and the second dimensionally-defined region. Then, based on this further determination, the metadata of the video may be updated to indicate availability of at least a time-delimited portion of the additional captured audio having a proximity connection to at least another corresponding time-delimited portion of the captured video.

Where a plurality of different audios are marked in metadata as associated with one particular surveillance camera, creating priorities to provide an emphasis of available audio tracks is contemplated. This may be based on, for example, a closest to furthest ranking of microphone distance to relevant moving objects that are detected by operation of the video analytics module 119 and/or the video analytics engine 194. For instance, the video analytics module 119 and/or the video analytics engine 194 may be configured to: detect at least one moving object and a respective at least one object location within the FOV of the at least one surveillance camera; determine that the at least one moving object is closer to some first microphone than some different, second microphone; and cause a particular time-delimited portion of captured audio (corresponding to the first microphone) to be emphasized over a portion of additional audio (corresponding to the second microphone) when the time-delimited portion of the captured video is caused to be played back within a VMS.

In another at least one example, the at least one surveillance camera may include another surveillance camera lacking any direct physical or direct communicative connection to the at least one microphone. This another surveillance camera may have another FOV configured to capture additional video, and this another FOV may provide additional camera coverage encompassing at least a third dimensionally-defined region defined in additional metadata of the additional video. In such a case, and beyond the illustrated actions of the illustrated method 200, there is a contemplated possibility of having a further determination being made, by way of comparing the portion of the audio metadata to a portion of the additional metadata of the additional video, that there is an additional region of overlap existing between the third dimensionally-defined region and the first dimensionally-defined region. Based on this further determination, the additional metadata of the additional video may be updated to indicate availability of another time-delimited portion of the captured audio having a proximity connection to at least a corresponding time-delimited portion of the additional captured video.

Figure 3:
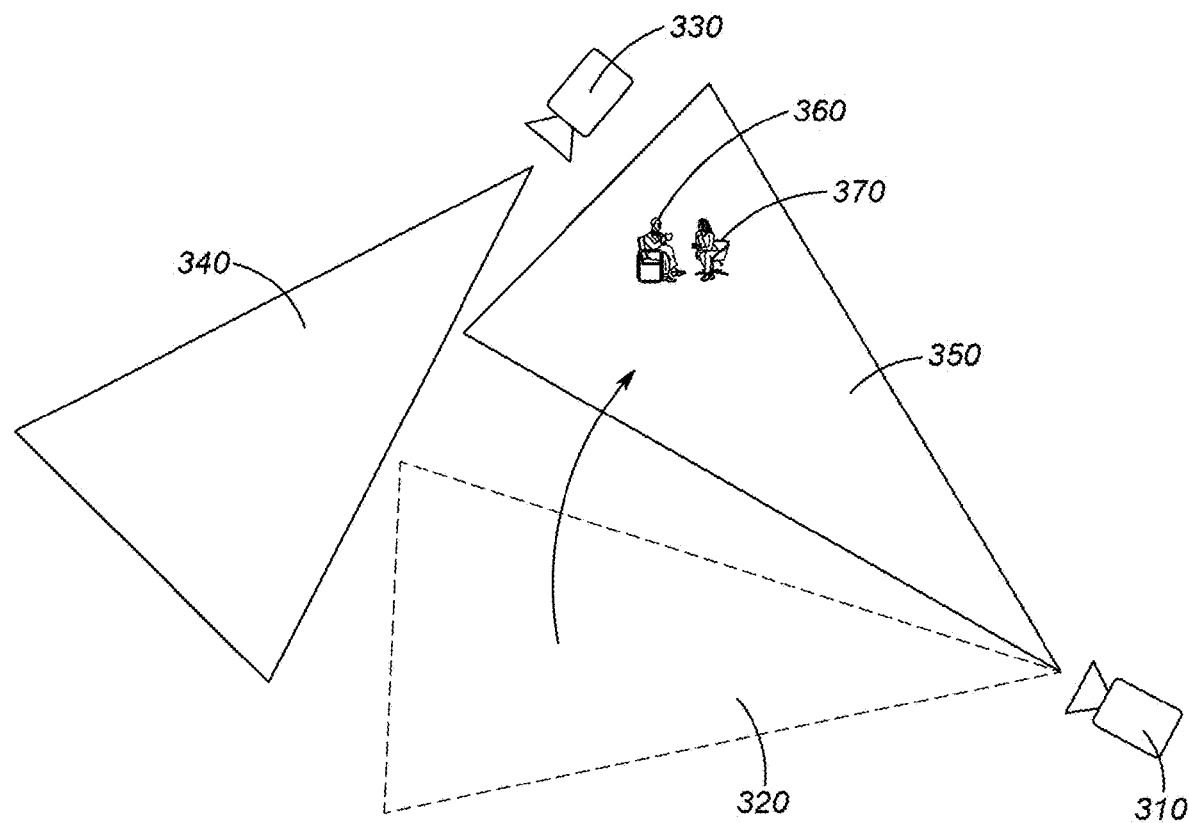
FIG. 3 is a diagram providing additional example detail in relation to the method illustrated in FIG. 2.

Reference is now made to FIG. 3. As shown therein, a video camera 310 has an initial FOV 320. Another video camera 330 having a respective FOV 340 is also shown in FIG. 3.

The FOV of the camera 310 is changed from the initial FOV 320 to a subsequent FOV 350 (this subsequent FOV is an example of the second dimensionally-defined region mentioned in connection with the aforementioned action 220 of the method 200 of FIG. 2). A notable difference between the initial FOV 320 and the subsequent FOV 350 is that the latter provides image capture coverage in respect of a first person 360 and a second person 370 (whereas the former does not).

Now assume that both of the video cameras 310 and 330 include respective microphones. In such a case the microphone(s) of the video camera 330 is determined (by the proximity relation determination module 192, for example)

to be closer to the first and second people 360 and 370 than the microphone(s) of the video camera 310. The method 200 is suitable for and can be implemented in this illustrated example. For example, the metadata of the video captured by the video camera 310 may be updated to indicate availability of a time-delimited portion of the audio captured by the microphone included in the video camera 330. Emphasis of that audio portion over any time-corresponding audio portion captured by the microphone included in the video camera 310 is also contemplated (e.g. as previously herein described).

Figure 4:
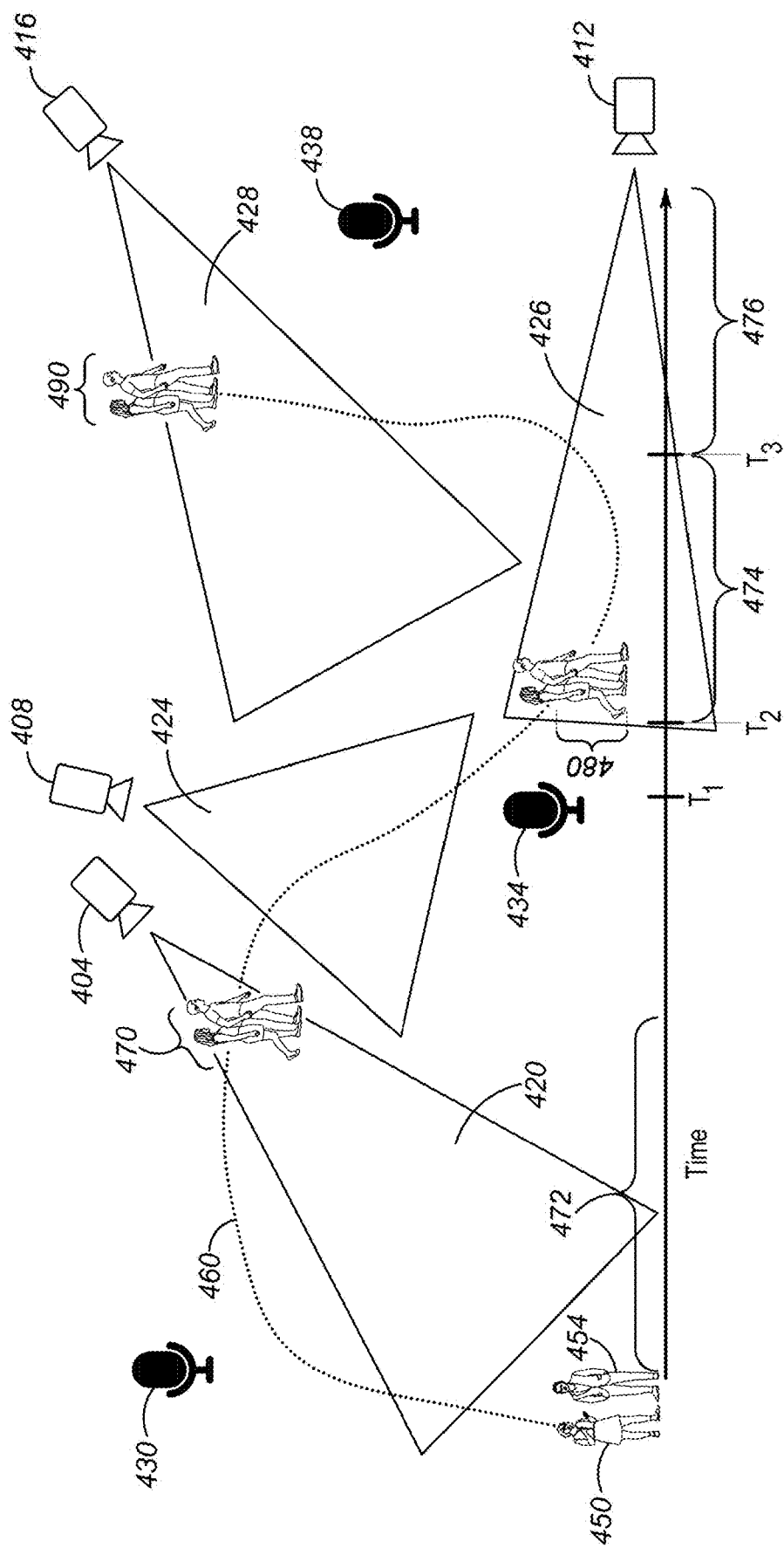
FIG. 4 is another diagram providing additional example detail in relation to the method of illustrated in FIG. 2.

Reference is now made to FIG. 4. As shown therein, first, second, third and fourth video cameras 404, 408, 412 and 416 have respective first, second, third and fourth FOVs 420, 424, 426 and 428. First, second and third microphone incorporating devices 430, 434 and 438 (i.e. corresponding to the separate audio capturing apparatus 196 described previously in connection with FIG. 1) are also shown in FIG. 4.

A woman 450 and a man 454 travel a path 460 across the first, second, third and fourth FOVs 420, 424, 426 and 428. At location 470, the woman and man 450 and 454 are within the FOV 420, and a portion of audio, captured by the first microphone incorporating device 430 and corresponding to a time duration 472, are relevant to video captured by the video camera 404 during the time duration 472. The metadata of the video captured by the video camera 404 may be updated to indicate availability of this time-delimited portion of the audio captured by the first microphone incorporating device 430.

In accordance with an example embodiment, automatically tracking of a path of movement of at least one moving object (such as, for example, the FIG. 4 illustrated path 460—a path of two objects) is carried out by the system. For instance, in the example of FIG. 4, the tracking includes leaving the FOV 424 of the camera 408 at a first point in time (time $T_1$), and then a continuing of the tracking as the woman and man 450 and 454 enter the FOV 426 of the video camera 412 (location 480) at a second point in time later than the first point in time (time $T_2$), and then a still further continuing of the tracking as the woman and man 450 and 454 leave the FOV 426 of the video camera 412 at a third point in time later than the second point in time (time $T_3$). In this described sequence, start and end times of the time-delimited portion of audio captured by the second microphone incorporating device 434 (which will be noted in the metadata of the video captured by the video camera 412) may be determined based at least in part on values of the second and third points in time (i.e. the times $T_2$ and $T_3$ mark a start and end of a time duration 474).

Similarly in respect of metadata of the video captured by the video camera 416, considering what is the relationship to audio captured by the third microphone incorporating device 438, it will be understood that a time-delimited portion of that audio (corresponding to time duration 476 when the woman and man 450 and 454 move along the path 460 to location 490) may be noted in that metadata of the captured video.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot electronically update metadata, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    at least one microphone configured to capture audio within a first dimensionally-defined region detailed in audio metadata of the audio;
    at least one video camera lacking any direct physical or direct communicative connection to the at least one microphone, and the at least one video camera having a dynamic or static Field Of View (FOV) configured to capture video, and the FOV providing camera coverage encompassing at least a second dimensionally-defined region defined in metadata of the video;
    at least one processor; and
    at least one electronic storage medium in communication with the at least one processor, the at least one electronic storage medium storing program instructions that when executed by the at least one processor cause the at least one processor to perform:
        making a determination, by comparing a portion of the audio metadata to a portion of the metadata of the video, that a region overlap exists between the first dimensionally-defined region and the second dimensionally-defined region; and
        based on the determination, updating the metadata of the video to indicate availability of at least a time-delimited portion of the captured audio having a proximity connection to at least a corresponding time-delimited portion of the captured video.

2. The system of claim 1 wherein the at least one video camera is a Pan-Tilt-Zoom (PTZ) camera and the FOV is a dynamic FOV, and the second dimensionally-defined region varies when at least one a zoom setting, a pan setting and a tilt setting is changed.

3. The system of claim 1 wherein:
the at least one microphone includes another microphone configured to capture additional audio within a third dimensionally-defined region detailed in additional audio metadata of the additional audio, the third dimensionally-defined region being different than the first dimensionally-defined region, and
execution of the program instructions by the at least one processor further causes:
making a further determination, by comparing a portion of the additional audio metadata to the portion of the metadata of the video, that an additional region overlap exists between the third dimensionally-defined region and the second dimensionally-defined region, and
based on the further determination, updating the metadata of the video to indicate availability of at least a time-delimited portion of the additional captured audio having a proximity connection to at least another corresponding time-delimited portion of the captured video.

4. The system of claim 1 wherein:
the at least one video camera includes another video camera lacking any direct physical or direct communicative connection to the at least one microphone, and the another video camera having another FOV configured to capture additional video, and the another FOV providing additional camera coverage encompassing at least a third dimensionally-defined region defined in additional metadata of the additional video, and
execution of the program instructions by the at least one processor further causes:
making a further determination, by comparing the portion of the audio metadata to a portion of the additional metadata of the additional video, that an additional region overlap exists between the third dimensionally-defined region and the first dimensionally-defined region, and
based on the further determination, updating the additional metadata of the additional video to indicate availability of another time-delimited portion of the captured audio having a proximity connection to at least a corresponding time-delimited portion of the additional captured video.

5. The system of claim 1 further comprising a server that includes the at least one processor, the server being remote from the at least one video camera.

6. The system of claim 1 wherein the at least one video camera includes the at least one processor.

7. The system of claim 1 wherein the at least one video camera includes another microphone configured to capture additional audio.

8. The system of claim 7 wherein execution of the program instructions by the at least one processor further causes:
detecting at least one moving object and a respective at least one object location within the FOV,
determining that the at least one moving object is closer to the at least one microphone than the another microphone, and
causing the time-delimited portion of the captured audio to be emphasized over a portion of the additional audio when the time-delimited portion of the captured video is caused to be played back within a video management system.

9. The system of claim 1 wherein execution of the program instructions by the at least one processor further causes:
automatically tracking a path of movement of at least one moving object including leaving an FOV of another video camera at a first point in time, entering the FOV of the at least one video camera at a second point in time later than the first point in time, and leaving the FOV of the at least one video camera at a third point in time later than the second point in time, and
determining start and end times of the time-delimited portion of the captured audio based at least in part on values of the second and third points in time.

10. The system of claim 1 further comprising a first camera housing that includes the at least one microphone, and
wherein the at least one video camera includes a second camera housing that is physically distinct and separated from the first camera housing.

11. A method comprising:
capturing audio via at least one microphone and within a first dimensionally-defined region detailed in audio metadata of the audio;
actuating at least one video camera to capture video, wherein the at least one video camera is lacking any direct physical or direct communicative connection to the at least one microphone, the at least one video camera has a dynamic or static Field Of View (FOV), and the FOV provides camera coverage encompassing at least a second dimensionally-defined region defined in metadata of the video;
operating at least one processor to execute program instructions to cause the at least one processor to perform:
making a determination, by comparing a portion of the audio metadata to a portion of the metadata of the video, that a region overlap exists between the first dimensionally-defined region and the second dimensionally-defined region; and
based on the determination, updating the metadata of the video to indicate availability of at least a time-delimited portion of the captured audio having a proximity connection to at least a corresponding time-delimited portion of the captured video.

12. The method of claim 11 wherein the at least one video camera is a Pan-Tilt-Zoom (PTZ) camera and the FOV is a dynamic FOV, and the second dimensionally-defined region varies when at least one a zoom setting, a pan setting and a tilt setting is changed.

13. The method of claim 11 wherein:
the at least one microphone includes another microphone that captures additional audio within a third dimensionally-defined region detailed in additional audio metadata of the additional audio, the third dimensionally-defined region being different than the first dimensionally-defined region, and
the operating of the at least one processor to execute the program instructions further causes:
making a further determination, by comparing a portion of the additional audio metadata to the portion of the metadata of the video, that an additional region overlap exists between the third dimensionally-defined region and the second dimensionally-defined region, and based on the further determination, updating the metadata of the video to indicate availability of at least a time-delimited portion of the additional captured audio having a proximity connection to at least another corresponding time-delimited portion of the captured video.

14. The method of claim 11 wherein:
the at least one video camera includes another video camera lacking any direct physical or direct communicative connection to the at least one microphone, and the another video camera having another FOV that captures additional video, and the another FOV providing additional camera coverage encompassing at least a third dimensionally-defined region defined in additional metadata of the additional video, and
the operating of the at least one processor to execute the program instructions further causes:
making a further determination, by comparing the portion of the audio metadata to a portion of the additional metadata of the additional video, that an additional region overlap exists between the third dimensionally-defined region and the first dimensionally-defined region, and
based on the further determination, updating the additional metadata of the additional video to indicate availability of another time-delimited portion of the captured audio having a proximity connection to at least a corresponding time-delimited portion of the additional captured video.

15. The method of claim 11 wherein the at least one video camera includes the at least one processor.

16. The method of claim 11 wherein the at least one video camera includes another microphone that captures additional audio.

17. The method of claim 16 wherein the operating of the at least one processor to execute the program instructions further causes:
detecting at least one moving object and a respective at least one object location within the FOV,
determining that the at least one moving object is closer to the at least one microphone than the another microphone, and
causing the time-delimited portion of the captured audio to be emphasized over a portion of the additional audio when the time-delimited portion of the captured video is caused to be played back within a video management system.

18. The method of claim 11 wherein the operating of the at least one processor to execute the program instructions further causes:
automatically tracking a path of movement of at least one moving object including leaving an FOV of another video camera at a first point in time, entering the FOV of the at least one video camera at a second point in time later than the first point in time, and leaving the FOV of the at least one video camera at a third point in time later than the second point in time, and
determining start and end times of the time-delimited portion of the captured audio based at least in part on values of the second and third points in time.

19. The method of claim 11 wherein:
the at least one microphone is included in a first camera housing, and
the at least one video camera includes a second camera housing that is physically distinct and separated from the first camera housing.

\* \* \* \* \*